Oct. 6, 1931.   W. T. DUNN ET AL   1,826,059
DRILLING HEAD
Filed Sept. 7, 1927

INVENTORS
William T. Dunn
John E. Shows
BY
ATTORNEY.

Patented Oct. 6, 1931

1,826,059

UNITED STATES PATENT OFFICE

WILLIAM TRACY DUNN, OF HOUSTON, AND JOHN ELGIN SHOWS, OF HARRISBURG, TEXAS

DRILLING HEAD

Application filed September 7, 1927. Serial No. 218,050.

This invention relates to drill heads to be used in earth boring operations, and particularly in well drilling.

The primary object of the invention is to provide a drill head for ready application to a shaft or rod and having cutters so arranged as to more quickly and efficiently drill a shaft than has heretofore been possible with other heads, and wherein opportunity for wear, breakage or derangement of the head or its parts are reduced to a minimum.

A further object is to provide an improved arrangement of cutter discs whereby material encountered in the drilling operation, however hard may readily be pierced, and whereby improved clearing cutters are employed for properly shaping and clearing the opening as the drilling operation proceeds.

A still further object is to provide improvement in the means for mounting the cutters, whereby the same may be readily removed or replaced when desired or required, and whereby friction and clogging of the cutters is materially reduced.

With these objects in view, together with others which will appear as the description proceeds, the invention consists in the novel construction, combination and arrangement of parts, all as will be described more fully hereinafter, illustrated in the drawings, and particularly pointed out in the claims.

Figure 1:
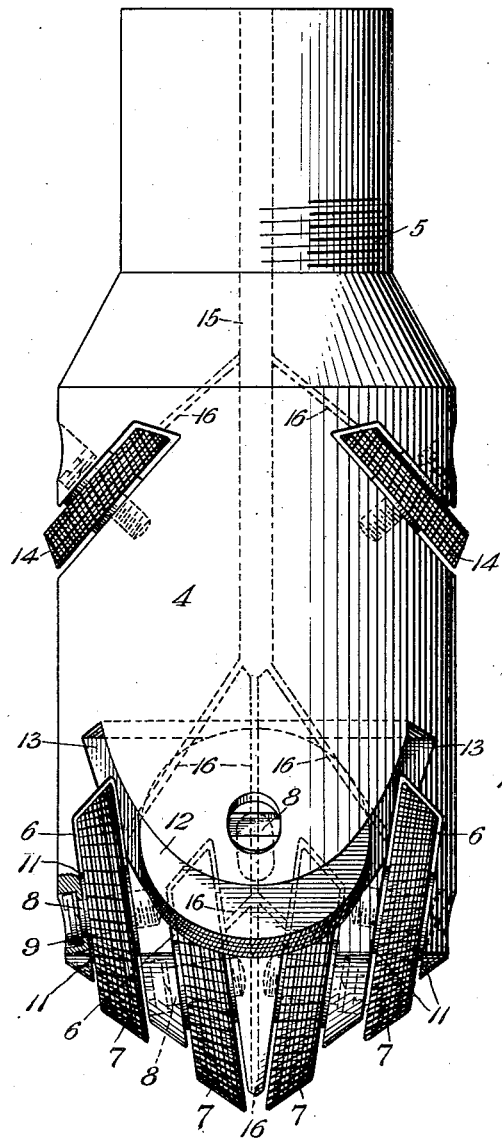
Fig. 1 is a side elevation of a drill head constructed in accordance with the invention.
Figure 2:
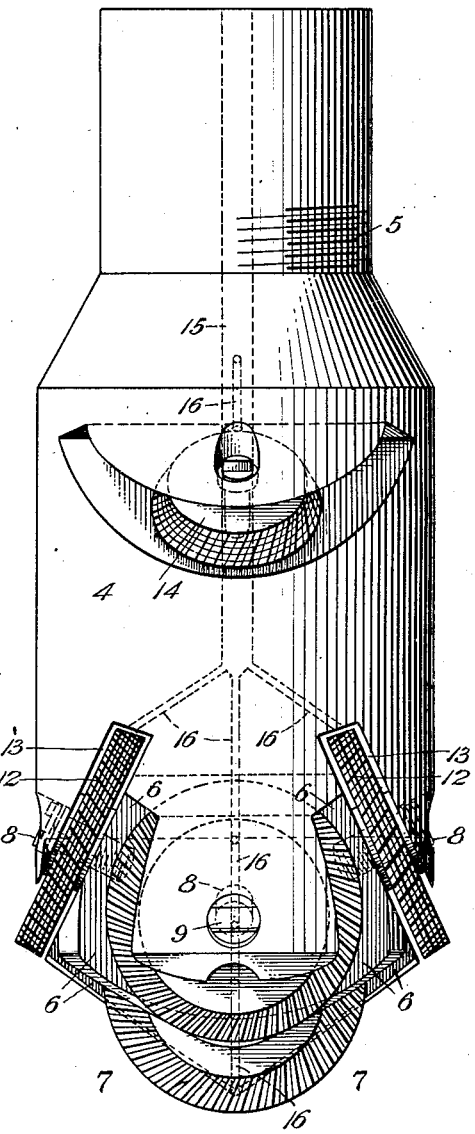
Fig. 2 is a similar view taken at right angles to Fig. 1.

Referring now more particularly to the drawings, the cutter head is represented generally at 4 and is preferably of substantially cylindrical formation of the desired diameter for the opening to be drilled. This head may be formed in the usual manner and of the materials customarily employed in this connection. The head is provided at the upper end with threads 5 by means of which the head may be properly secured to a drill shaft or rod. The upper end of the head may be reduced in diameter as shown to facilitate clearing of the hole as the drilling operation progresses.

The head has its operative or lower end tapered to a substantially blunt point as shown, providing a substantially conical surface at the operative end of the head. This surface is provided with a series of recesses 6 within which are rotatably mounted disc cutters 7. Each cutter is rotatably mounted upon a shaft or stud 8 headed at one end as at 9 and threaded at its opposite end, as shown, to engage within an internally threaded recess in the head for securely holding the shaft or stud in position. A lock washer may be associated with each of these studs to hold the same securely in position. The shaft or stud in each instance also supports a pair of washers or discs 11, one upon each side of the cutting disc to minimize friction and to obviate clogging of the disc.

Each of the recesses 6 is inclined with respect to the axis of the head, and converges downwardly. The operative faces of the cutting discs are bevelled or inclined as shown so that said operative faces will be disposed substantially parallel to the inclined or tapered end of the cutter head. This construction and arrangement produces a proper inclination for the operative faces of the cutting discs, whereby effective reaming action is secured upon rotation of the head.

In the sides of the head, preferably at right angles to the axes of the cutters 7, and positioned above the upper ends of the latter are reaming discs or cutters 12. These cutters are mounted each in a recess 13 in the cutter head inclining downwardly and outwardly from the axis of the latter. The studs or shafts 8 supporting these cutters are constructed similarly to those already described, and it will be observed that the operative faces of these reaming discs are disposed outwardly beyond the sides of the head and are so located and shaped as to lie substantially in the same surface with the conical surface of the lower end of the head.

Additional or clearing cutters 14 are arranged in the side of the head at substantially right angles to the reaming discs 12 and spaced substantially above the latter. These clearing cutters may be somewhat smaller in diameter than the cutters heretofore described, and have their operative faces disposed slightly beyond the outer face of the cutter head and at a slight angle thereto. These clearing cutters are preferably mounted in the manner similar to the arrangement of the aforementioned cutting discs.

The head is provided with an axial channel 15, having branch ducts 16 leading to the several recesses wherein the cutters are arranged. This channel is supplied with water, as usual, which flows through the several channels or ducts into the recesses to prevent clogging and to facilitate free rotation of the several cutters.

In operation, it is apparent that rotation of the head in the usual manner will cause the cutters 7 to penetrate the earth and bore an opening with a tapering or substantially conical bottom. This facilitates the action of cutting or wearing away hard substances encountered. Rotation of the tool also causes the reaming discs or cutters 12 to enlarge and partly clear the opening as the drilling operation progresses, while the clearing cutters 14 operate to further break away or dislodge matter accumulating behind or following the cutter head.

From the foregoing it is apparent that we have provided a drilling head which is of extremely simple construction and yet by the arrangement and association of cutting discs, as well as their mounting and formation, which simplifies drilling operation and assures efficiency in the drilling process. The particular construction causes a tapered, or pointed opening to be dug, is self-cleaning, and may be operated at considerably less pressure than has heretofore been necessary in similar operations. The water lines or ducts prevent heating of the discs and assure cleaning of the latter at all times. The head may be made in various sizes in accordance with the work to be performed, and the number of discs may be increased or diminished as desired.

Having thus described our invention, we claim:

1. In a drilling tool, a head having a substantially cone-shape operative end, the said cone shape portion having downwardly converging recesses therein disposed upon opposite sides of the axis of the head in pairs, the recesses of each pair being parallel to each other, disc cutters arranged in said recesses and protruding beyond the end of said head, and the edges of said cutters bevelled so as to be disposed parallel to said cone-shaped portion.

2. In a drilling tool, a head having a substantially cone shape operative end, the said operative end having recesses therein arranged in pairs upon opposite sides of the axis of rotation of said head, the walls of each recess being parallel with each other as well as with the walls of the other recess of its pair, the recesses on opposite sides of said axis of rotation converging downwardly, disk cutters of equal sizes arranged one in each recess, a bearing for each cutter, the bearings for each pair being parallel but in different planes, said bearings being perpendicular to said recesses, the cutting edges of said disks beveled corresponding to the inclination of the cone portion through which they project, and reaming disks at diametrically opposite sides of said head with their cutting edges beveled and disposed in the same surface with said cone portion.

In testimony whereof we hereby affix our signatures.

WILLIAM TRACY DUNN.
JOHN ELGIN SHOWS.